United States Patent

[11] 3,538,889

| [72] | Inventors | Lu Verne W. Keller;<br>La Mont E. Keller, Wisner, Nebraska 68791 |
|---|---|---|
| [21] | Appl. No. | 724,989 |
| [22] | Filed | April 29, 1968 |
| [45] | Patented | Nov. 10, 1970 |

[54] PORTABLE LOADING CHUTE STRUCTURE
9 Claims, 4 Drawing Figs.

| [52] | U.S. Cl. | 119/82 |
|---|---|---|
| [51] | Int. Cl. | A01k 29/00 |
| [50] | Field of Search | 119/82; 280/30 |

[56] References Cited
UNITED STATES PATENTS

| 2,840,041 | 6/1958 | Fleming | 119/82 |
|---|---|---|---|
| 2,941,813 | 6/1960 | Price | 119/82X |
| 3,241,527 | 3/1966 | Burns et al. | 119/82 |

*Primary Examiner*—Hugh R. Chamblee
*Attorney*—Buckhorn, Blore, Klarquist and Sparkman

ABSTRACT: A loading chute 10 pivotally mounted on a trailer axle 12 carried by wheels 14 is slightly overbalanced forwardly and is movable between a horizontal traveling position in which legs 16 and braces 18 are folded up to the bottom of the chute and a loading position in which the legs engage the ground and the braces are overcenter locked. The legs may be partly unfolded to engage the ground and the trailer then moved rearwardly to fully unfold the legs and braces.

Patented Nov. 10, 1970

3,538,889

INVENTORS
LU VERNE W. KELLER
LA MONT E. KELLER
BY
BUCKHORN, BLORE, KLARQUIST & SPARKMAN
ATTORNEYS

PORTABLE LOADING CHUTE STRUCTURE

DESCRIPTION

This invention relates to a portable loading chute structure, and more particularly to an easily tilted loading chute structure.

An object of the invention is to provide a new and improved portable loading chute structure.

Another object of the invention is to provide an easily tilted loading chute structure.

A further object of the invention is to provide a loading chute structure which has a chute pivotal on a wheeled axle and also has supporting legs on the front end portion of the chute which are movable between folded storage positions and extended supporting positions.

Another object of the invention is to provide a loading chute structure having legs movable first from folded positions lying along a chute to inclined ground-engaging positions and then movable, as the chute and a wheeled supporting axle are movable rearwardly to fully upright positions holding the chute in an inclined, loading position.

The invention provides a loading chute structure including a chute movable on a wheeled supporting axle from a horizontal travel position to a tilted loading position. Leg means on the chute ahead of the axle are movable from a retracted storage position to an extended chute-supporting position. Preferably the leg means is pivoted on the chute from its storage position in which it lies along the bottom of the chute first to an intermediate position engaging the ground and then, as the wheeled axle and the chute are moved rearwardly, is moved to its fully upright position to tilt the chute and hold it in its tilted position. Preferably, folding braces are connected between the legs and the chute and are movable between folded storage positions lying along the chute and lock bracing positions.

Figure 1:
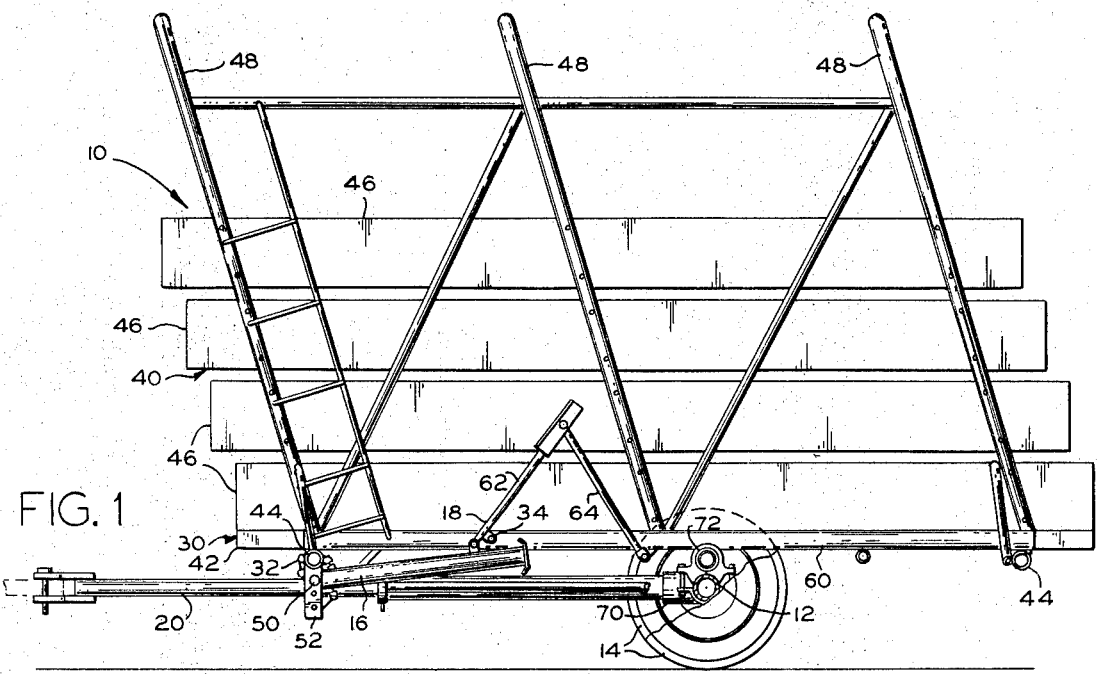
FIG. 1 is a side elevation view of a portable loading chute structure in its travel position.
Figure 2:
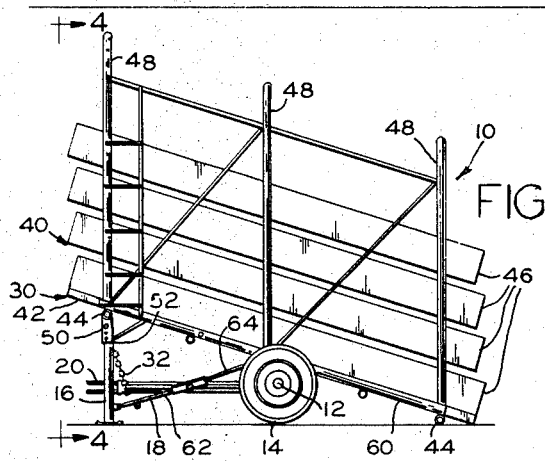
FIG. 2 is a view similar to FIG. 1 but with the chute structure in its loading position.

Referring now in detail to the drawings, there is shown therein a portable loading chute structure forming one embodiment of the invention and including a loading chute 10 pivotally mounted on a trailer axle 12 carried by wheels 14 mounted rotatably thereon. The chute 10 is movable from a horizontal travel position shown in FIG. 1 to an intermediate position shown in FIG. 3 in which legs 16 engage the ground and braces 18 are partially unfolded. Then, as a tongue 20 secured to the axle is pushed rearwardly by the truck or tractor (not shown) towing the chute structure, the lower ends of the legs stay at the same spots on the ground and the chute 10 is tilted further until its rear end engages the ground, which is the loading position as best shown in FIG. 2. The legs at this time are vertical and the braces are in fully extended, slightly overcenter positions. A truck then may be backed up to the raised front end of the chute and livestock loaded into the truck or unloaded therefrom.

Figure 3:
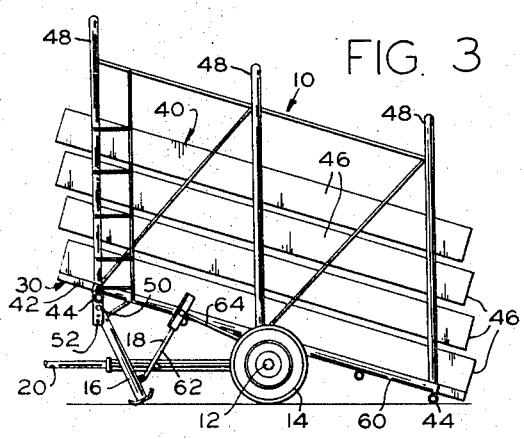
FIG. 3 is a view similar to FIG. 1 but with the chute structure in an intermediate position preparatory to being placed in its loading position.
Figure 4:
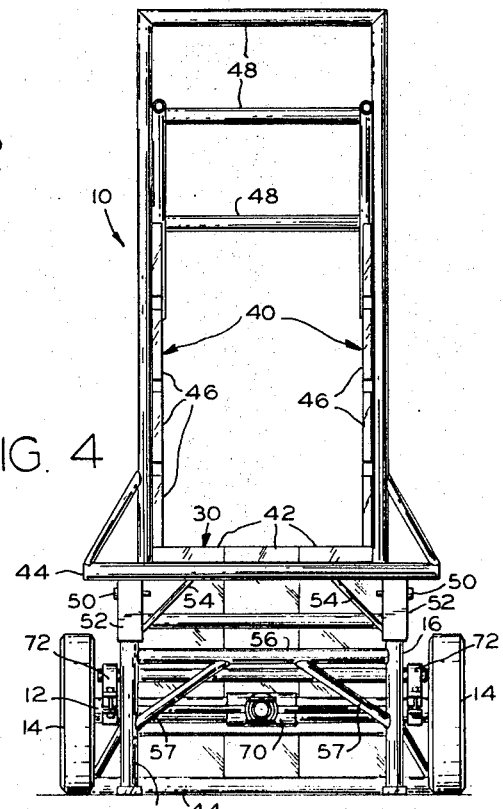
FIG. 4 is an enlarged, fragmentary front elevation view of the portable loading chute structure of FIG. 1.

The chute structure may be easily and quickly moved back to its travel position simply by pushing the braces slightly from their overcenter locked positions, pulling the chute structure forwardly either manually or with a towing vehicle to a position slightly beyond the intermediate position shown in FIG. 3. The chute is slightly overbalanced forwardly relative to the axle 12, and once the engagement of the legs with the ground is broken, continues to move until the front end of a bed 30 of the chute engages the tongue 20 as shown in FIG. 1. A chain 32 then may be tightened to lock the front end of the bed to the tongue for travel. The legs 16 and braces 18 then are folded fully back up to travel positions lying along the bottom of the bed as shown in FIG. 1 and secured in these positions by a latch 34.

The bed 30 and sides 40 are constructed of planking and steel pipes with diagonal bracing. Bottom planks 42 are bolted to cross pipes 44 of the bed and side planks 46 are bolted to arched pipes 48. Kingpins 50 are secured in selected holes in vertical channels 52 welded to the front cross pipe 44 and braced by diagonal braces 54. The legs 16 are secured rigidly together by a cross pipe 56 and diagonal braces 57 to form a rigid, H-shaped structure. The kingpins extend through aligned holes in the upper end portions of the legs and through pairs of aligned holes in the channels 52, and the lower end portions of the channels act as stops to limit forward swinging movement of the legs. There are several, vertically spaced pairs of holes in the channels so that the effective length of the legs may be varied as desired by shifting the kingpins from the holes in the channels at one level to the holes in the channels at a different level. The channels are positioned outwardly from the sides 40 and the braces 18 are connected pivotally to outer longitudinal pipes 60 of the bed and to the rear sides of the legs 16, links 62 and 64 of the braces 18 being substantially the same length.

The tongue is secured rigidly to the axle by a wishbone structure 70, and the bed 30 is pivotally secured to the axle by bearings 72. The bearings 72 are secured to an intermediate one of the cross pipes of the bed 30, which is located at such a position that the chute is just slightly overbalanced forwardly. This makes it easy to tilt it rearwardly while normally holding it in the travel position.

The above loading chute structure may be easily manipulated by one man, and is quickly and easily moved between its loading and travel positions. The chute is strong while being simple and inexpensive in its construction.

We claim:

1. In a portable loading chute structure:
    a loading chute;
    wheeled axle means pivotally supporting the loading chute for movement between a level traveling position and a rearwardly tilted loading position;
    leg means;
    connecting means mounting the leg means on the chute for movement between a loading position engaging the ground and holding the chute in its loading position and a storage position lying along the chute;
    and brace means movable between a position locking the leg means in its loading position and a storage position lying along the chute;
    the connecting means mounting the upper end portion of the leg means pivotally on the forward end portion of the chute for movement between a substantially vertical position, when the chute and the leg means are in their loading positions, and a rearwardly extending position when in its storage position; and
    the leg means being movable to an intermediate, ground-engaging position while the chute is in its traveling position and being movable from said intermediate position to said vertical position by rearward movement of the wheeled axle means to move the chute to said loading position.

2. The portable loading chute structure of claim 1 wherein the connecting means includes bracket members secured to the chute and mounting the leg means pivotally and including stop means for limiting forward swinging movement of the leg means beyond the loading position thereof.

3. The portable loading chute structure of claim 2 wherein the bracket members are channels opening rearwardly and in substantially vertical positions when the chute is in its loading position.

4. The portable loading chute structure of claim 3 wherein the channels have vertically spaced pairs of holes for the reception of kingpins pivotally mounting upper end portions of the leg means in the pairs at any selected level.

5. The portable loading chute structure of claim 1 wherein the brace means comprises a pair of links connected respectively to the chute and the leg means and overcenter joint means connecting the links together.

6. The portable loading chute structure of claim 1 wherein the leg means comprises a pair of vertical legs and cross frame means rigidly connecting the legs together.

7. The portable loading chute structure of claim 6 wherein the cross frame means and the legs form an H-shaped structure.

8. The portable loading chute structure of claim 1 wherein the loading chute comprises a plurality of tubular, arched crossframe members and a plurality of tubular longitudinal members rigidly secured to the crossframe members.

9. The portable loading chute structure of claim 1 including latch means for securing the leg means to the chute in the storage position of the leg means.